(12) United States Patent
Ding et al.

(10) Patent No.: US 9,571,672 B2
(45) Date of Patent: *Feb. 14, 2017

(54) ADDITIONAL INPUT SOURCES FOR DATA ACQUISITION AT DISTRIBUTED SCAN MANAGEMENT SYSTEMS (71) Applicants: Yi Ding, Saratoga, CA (US); Jiang Hong, San Jose, CA (US)

(72) Inventors: Yi Ding, Saratoga, CA (US); Jiang Hong, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/872,933

(22) Filed: Oct. 1, 2015

(65) Prior Publication Data
US 2016/0021263 A1 Jan. 21, 2016

Related U.S. Application Data (63) Continuation of application No. 13/398,704, filed on Feb. 16, 2012, now Pat. No. 9,270,842.

(51) Int. Cl.
G06F 3/12 (2006.01)
H04N 1/00 (2006.01)

(52) U.S. Cl.
CPC ...... *H04N 1/00172* (2013.01); *H04N 1/00127* (2013.01); *H04N 2201/0081* (2013.01)

(58) Field of Classification Search
None
See application file for complete search history.

(56) References Cited

U.S. PATENT DOCUMENTS

2006/0215208 A1 9/2006 Takayama
2006/0290967 A1 12/2006 Sumitomo et al.
2007/0177192 A1 8/2007 Wang
(Continued)

OTHER PUBLICATIONS

Hameed: "Windows 7 / Windows Server, 2008, R2: Distributed Scan Management", dated Oct. 11, 2009, 4 pages.*
(Continued)

*Primary Examiner* — Vincent Rudolph
*Assistant Examiner* — Richa Mishra
(74) *Attorney, Agent, or Firm* — Hickman Palermo Becker Bingham LLP; Edward A. Becker (57) ABSTRACT A method and apparatus is provided for acquiring document data from additional input sources to a DSM system. In an embodiment, a DSM computing device includes a remote image receiver service configured to connect to a remote image source via a network connection, receive configuration information and image data from the remote image source, and determine post scan processing instructions based, at least in part, on the configuration information. In another embodiment, a DSM computing device includes an input selection service configured to identify one or more input sources available at the computing device, receive input source information identifying a particular input source of the one or more input sources, receive image information identifying the particular image data residing on the particular input source, retrieve the particular image data from the particular input source, and make the particular image data available to a distributed scan management service.

15 Claims, 5 Drawing Sheets

(56) References Cited

U.S. PATENT DOCUMENTS

| | | | |
|---|---|---|---|
| 2007/0263260 A1* | 11/2007 | Ohta | H04N 1/00856 358/448 |
| 2009/0219561 A1 | 9/2009 | Kozuka | |
| 2009/0240697 A1* | 9/2009 | Fenelon | G06F 17/30011 |
| 2009/0290190 A1 | 11/2009 | Torii | |
| 2010/0157349 A1 | 6/2010 | Hong | |
| 2011/0149352 A1 | 6/2011 | Ding | |
| 2012/0194837 A1 | 8/2012 | Kamata | |
| 2013/0155443 A1 | 6/2013 | Wu et al. | |
| 2013/0215453 A1 | 8/2013 | Ding et al. | |
| 2013/0222861 A1 | 8/2013 | Ding et al. | |

OTHER PUBLICATIONS

Mike Fenelon and Erhan Soyer-Osman: "Distributed Scan Management", Internet Citation, dated Nov. 6, 2008, 25 pages.

European Patent Office, "Search Report" in application No. 12198673.1-1903, dated Sep. 1, 2014, 7 pages.

2011 Microsoft Windows, "Distributed Scan Processing Web Service Protocol Summary", dated Dec. 1, 2011, 3 pgs.

2011 Microsoft Windows, "Distributed Scan Device Web Service Protocol Summary", dated Dec. 1, 2011, 3 pgs.

U.S. Appl. No. 13/398,704, filed Feb. 6, 2012, Final Office Action mailed Nov. 27, 2013.

U.S. Appl. No. 13/398,704, filed Feb. 16, 2012, Office Action mailed Jul. 30, 2013.

U.S. Appl. No. 13/406,401, filed Feb. 27, 2012, Notice of Allowance, Dec. 11, 2013.

U.S. Appl. No. 13/398,704, filed Feb. 16, 2012, Office Action, Mar. 19, 2014.

U.S. Appl. No. 13/398,704, filed Feb. 16, 2012, Office Action, Jan. 12, 2015.

U.S. Appl. No. 13/398,704, filed Feb. 16, 2012, Final Office Action, Aug. 5, 2015.

U.S. Appl. No. 13/398,704, filed Feb. 16, 2012, Advisory Action, Sep. 30, 2014.

U.S. Appl. No. 13/398,704, filed Feb. 16, 2012, Final Office Action, Jun. 24, 2014.

U.S. Appl. No. 13/331,992, filed Dec. 20, 20110, Final Office Action, Dec. 26, 2013.

U.S. Appl. No. 13/331,992, filed Dec. 20, 2011, Notice of Allowance, Apr. 23, 2015.

U.S. Appl. No. 13/331,992, filed Dec. 20, 2011, Final Office Action, Nov. 17, 2014.

U.S. Appl. No. 13/331,992, filed Dec. 20, 2011, Office Action, Apr. 9, 2014.

U.S. Appl. No. 13/406,401, filed Feb. 27, 2012, Office Action, Aug. 13, 2013.

U.S. Appl. No. 13/331,992, filed Dec. 20, 2011, Office Action, Aug. 13, 2013.

U.S. Appl. No. 13/398,704, filed Feb. 16, 2012, Notice of Allowance, Oct. 19, 2015.

\* cited by examiner

ADDITIONAL INPUT SOURCES FOR DATA ACQUISITION AT DISTRIBUTED SCAN MANAGEMENT SYSTEMS

CROSS-REFERENCE TO RELATED APPLICATIONS

This application claims the benefit as a Continuation of prior U.S. patent application Ser. No. 13/398,704, filed Feb. 16, 2012, titled "Additional Input Sources For Data Acquisition At Distributed Scan Management Systems", the entire contents of which is hereby incorporated by reference for all purposes as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

This application is related to U.S. Pat. No. 9,124,820, filed Dec. 20, 2011, titled "Content-Based Security Processing Using Distributed Scan Management Protocols", the entire contents of which is hereby incorporated by reference for all purposes as if fully set forth herein.

This application is also related to U.S. Pat. No. 8,705,062, filed Feb. 27, 2012, titled "Quotas In Distributed Scan Management Systems", the entire contents of which is hereby incorporated by reference for all purposes as if fully set forth herein.

FIELD OF THE INVENTION

The present invention relates to acquiring image data, by an enterprise scanning system, from additional input sources to the scanning system.

BACKGROUND

An enterprise scanning system implements protocols that allow for entities to easily route documents that enter the system via a scanning device according to rules determined by system administrators and/or users of scanning devices. An example enterprise scanning system is Distributed Scan Management (DSM) implemented by Microsoft and deployed in Windows 7/Windows 2008 Server R2.

An enterprise scanning system that is implemented using DSM (a "DSM system") allows a user to authenticate user data via a DSM scanning device and to select from one or more sets of post scan processing instructions that are made available to the user. A set of post scan processing instructions (PSP) contains instructions for routing acquired documents, including one or more destinations to which acquired document data should be sent. For example, a PSP may indicate that acquired document data should be emailed to one or more email addresses, copied to one or more specified file servers, uploaded to one or more specified websites, etc. A PSP may also include, among other things, settings for scanning data such as color style, scan resolution, file format type, etc.

After a user is authenticated and has selected a PSP, the user may scan document data into the system at the DSM scanning device. The DSM system processes the scanned document data according to the selected PSP.

DSM systems do not allow data acquisition in manners other than via scanning. This limitation of the manner of introducing data into a DSM system limits the usefulness of processing document data using the DSM system. It would be advantageous for a DSM system to allow users to introduce document data for processing by the DSM system from both scanners and other types of input sources external to the DSM system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An approach is provided for acquiring document data from additional input sources to a DSM system. In an embodiment, a computing device through which the document data is acquired includes a distributed scan management service that implements a distributed scan device protocol and a distributed scan processing protocol. The distributed scan management service is configured to send image data and post scan processing instructions to a scan server. The computing device also includes a remote image receiver service configured to connect to a remote image source via the network connection, receive configuration information and the image data from the remote image source, and determine the post scan processing instructions based, at least in part, on the configuration information.

In embodiments, the computing device also includes a configuration service configured to authenticate user information, retrieve one or more sets of post scan processing instructions associated with the user information, receive selection of the post scan processing instructions, which is a particular set of post scan processing instructions from the one or more sets of post scan processing instructions, and associate a configuration identifier with the user information and the post scan processing instructions. In such embodiments, the configuration information comprises the configuration identifier. In further embodiments, the configuration information comprises an identifier of the post scan processing instructions.

Embodiments include the remote image receiver service further configured to connect to the remote image source via the network connection using Web services, and receive the configuration information and the image data from the remote image source using Web services.

In an embodiment, a computing device through which the document data is acquired includes a distributed scan management service that implements a distributed scan device protocol and a distributed scan processing protocol. The distributed scan management service is configured to receive information for post scan processing instructions, and send particular image data and the post scan processing instructions to a scan server. The computing device also includes an input selection service configured to identify one or more input sources available at the computing device, receive input source information identifying a particular input source of the one or more input sources, receive image information identifying the particular image data residing on the particular input source, retrieve the particular image data from the particular input source, and make the particular image data available to the distributed scan management service. In a further embodiment, the computing device includes a scan service configured to scan a document, wherein the particular image data is not generated by the scan service.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An approach is provided for acquiring document data from additional input sources to a DSM system. In an embodiment, a computing device through which the document data is acquired includes a distributed scan management service that implements a distributed scan device protocol and a distributed scan processing protocol. The distributed scan management service is configured to send image data and post scan processing instructions to a scan server. The computing device also includes a remote image receiver service configured to connect to a remote image source via the network connection, receive configuration information and the image data from the remote image source, and determine the post scan processing instructions based, at least in part, on the configuration information.

In embodiments, the computing device also includes a configuration service configured to authenticate user information, retrieve one or more sets of post scan processing instructions associated with the user information, receive selection of the post scan processing instructions, which is a particular set of post scan processing instructions from the one or more sets of post scan processing instructions, and associate a configuration identifier with the user information and the post scan processing instructions. In such embodiments, the configuration information comprises the configuration identifier. In further embodiments, the configuration information comprises an identifier of the post scan processing instructions.

Embodiments include the remote image receiver service further configured to connect to the remote image source via the network connection using Web services, and receive the configuration information and the image data from the remote image source using Web services.

In an embodiment, a computing device through which the document data is acquired includes a distributed scan management service that implements a distributed scan device protocol and a distributed scan processing protocol. The distributed scan management service is configured to receive information for post scan processing instructions, and send particular image data and the post scan processing instructions to a scan server. The computing device also includes an input selection service configured to identify one or more input sources available at the computing device, receive input source information identifying a particular input source of the one or more input sources, receive image information identifying the particular image data residing on the particular input source, retrieve the particular image data from the particular input source, and make the particular image data available to the distributed scan management service. In a further embodiment, the computing device includes a scan service configured to scan a document, wherein the particular image data is not generated by the scan service.

Architecture for Processing Acquired Document Data

Figure 1:
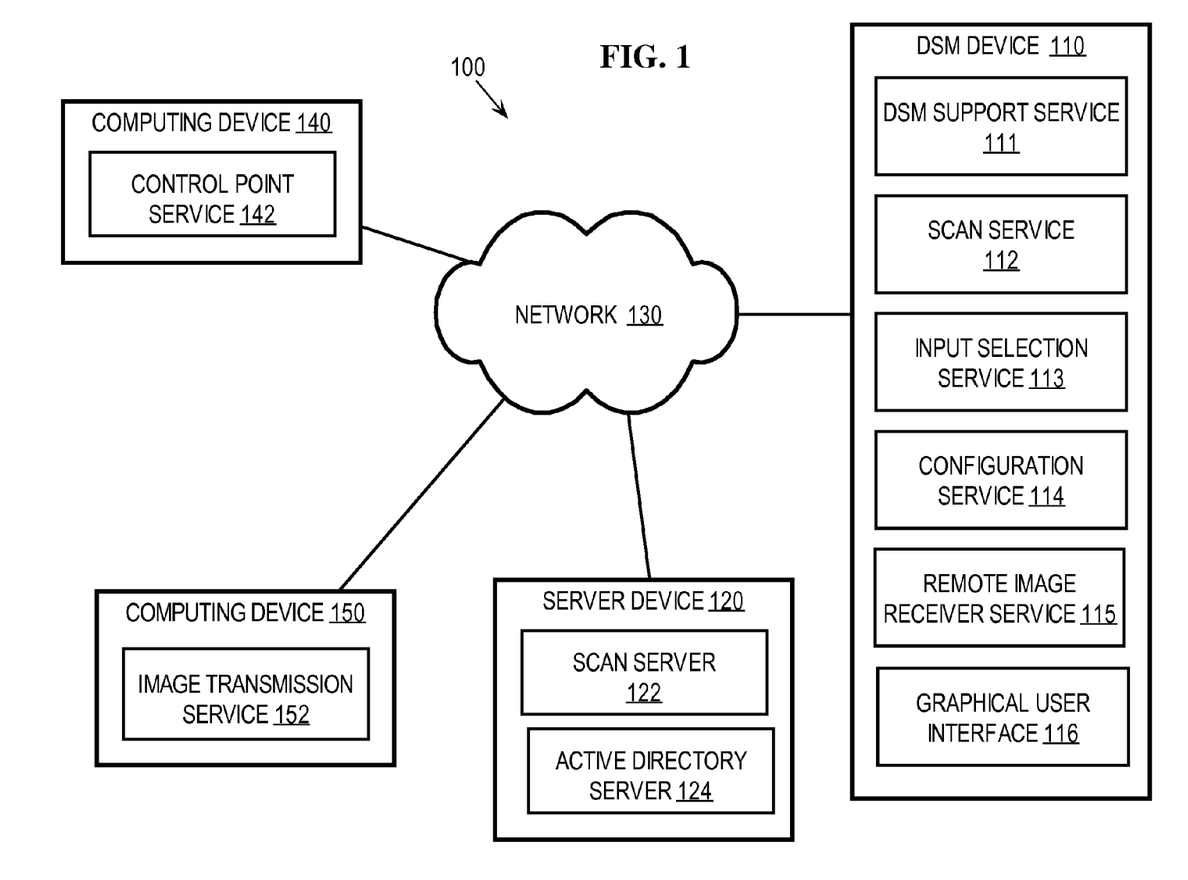
FIG. 1 is a block diagram that depicts an example network arrangement for acquiring document data from additional input sources to a DSM system.

FIG. 1 is a block diagram that depicts an example network arrangement 100 for acquiring document data from additional input sources to the DSM system represented in example network arrangement 100, according to embodiments. Network arrangement 100 includes a DSM device 110, a server device 120, and computing devices 140 and 150, communicatively coupled via a network 130. The DSM system represented in example network arrangement 100 includes the services and servers on DSM device 110, server device 120, and computing device 140, and may include other services and servers according to a particular implementation.

In example network arrangement 100, DSM device 110 is configured to acquire document data via selected or remote input sources, and process the data according to a selected PSP, as described in further detail below. An input source may be external to the DSM system of example network arrangement 100, i.e., an input source that is physically separate from devices that host services and servers for the DSM system. An input source that is external to the DSM system of example network arrangement 100 may be communicatively connected to a device that hosts one or more services and/or servers for the DSM system, e.g., via network 130, via a USB port, serial port, or other physical connection receptor of a device that hosts one or more services and/or servers for the DSM system, etc.

DSM device 110 may be implemented by any type of device that is capable of acquiring document data, implementing a distributed scan device protocol and a distributed scan processing protocol, and communicating with one or more of server device 120, computing device 140, and computing device 150 via network 130. A description of a distributed scan device protocol may be found in "DISTRIBUTED SCAN DEVICE WEB SERVICE PROTOCOL SUMMARY" located at "en-us/library/windows/hardware/ff540604%28v=VS.85%29.aspx" on the server "msdn.microsoft.com", the contents of which are incorporated by reference as if fully set forth herein. Further, a description of a distributed scan processing protocol may be found in "DISTRIBUTED SCAN PROCESSING WEB SERVICE PROTOCOL SUMMARY" located at "en-us/library/windows/hardware/ff540624%28v=VS.85%29.aspx" on the server "msdn.microsoft.com", the contents of which are also incorporated by reference as if fully set forth herein.

In example network arrangement 100, DSM device 110 is configured with a DSM support service 111, a scan service 112, an input selection service 113, a configuration service 114, a remote image receiver service 115, and a graphical user interface 116. DSM device 110 may be configured with other mechanisms, processes and functionality, depending upon a particular implementation. According to particular embodiments, DSM device 110 may be configured without one or more of the services associated therewith in example network arrangement 100. The approaches described herein for processing acquired document data are not limited to any particular type of DSM device or network configuration. For example, implementations of DSM device 110 may include a computing device, a scanning device, a multi-function peripheral (MFP) that performs any combination of printing, copying, facsimile, and scanning, etc. Any number of devices, including printing devices, scanning devices, client devices, administrative console devices, and other computing devices, may be included in the network.

DSM support service 111 may be implemented by one or more processes, and communicates with other applications and network devices. These communications include communications via (a) a distributed scan device protocol to communicate with a control point, e.g., control point service 142 of computing device 140; and (b) a distributed scan processing protocol to communicate with a scan server, e.g., scan server 122 of server device 120. In an embodiment, one or more of the protocols implemented by DSM support service 111 are performed using Web services. In an embodiment, all of the communications made by DSM device 110 via network 130 is done using Web services. In these embodiments, at least DSM support service 111, configuration service 114, remote image receiver service 115, scan server 122, Active Directory server 124, control point service 142, and image transmission service 152 implement one or more Web services protocols, described in more detail below.

Scan service 112 is implemented by one or more processes for acquiring document data via a scanning device at DSM device 110 or made available to DSM device 110, e.g., via network 130. Input selection service 113 is implemented by one or more processes configured to identify one or more input sources available at DSM device 110 and retrieve image data from an available input source, as described in further detail below. Configuration service 114 is implemented by one or more processes configured to associate user information and selected post scan processing instructions with a configuration identifier, and is also described in further detail below. Remote image receiver service 115 is implemented by one or more processes configured to connect to a remote image source and receive image data from the remote image source, and is also described in further detail below. The services attributed to DSM device 110 in example network arrangement 100 are illustrative and the functions attributed to these services herein may be performed by any logical module at DSM device 110.

DSM support service 111, scan service 112, input selection service 113, configuration service 114, and remote image receiver service 115 may be implemented as resident processes on DSM device 110, e.g., as Java servlets. Alternatively, one or more of DSM support service 111, scan service 112, input selection service 113, configuration service 114, and remote image receiver service 115 may be made available to DSM device 110 on removable media or may be implemented at a remote location with respect to DSM device 110. Also, DSM support service 111, scan service 112, input selection service 113, configuration service 114, and remote image receiver service 115 may be implemented as plug-ins, or in hardware, software, or any combination of hardware or software, depending upon a particular implementation.

DSM device 110 is further configured with graphical user interface 116. Graphical user interface 116 may be displayed at a display device associated with DSM device 110. A display device may be a monitor, a screen on DSM device 110, etc. Graphical user interface 116 may be implemented in a browser, as a stand-alone application, etc., and may be managed by any service at DSM device 110.

Network 130 may be implemented with any type of medium and/or mechanism that facilitates the exchange of information between two or more of DSM device 110, server device 120, and computing devices 140 and 150. Furthermore, network 130 may use any type of communications protocol, and may be secured or unsecured, depending upon the requirements of a particular embodiment.

Server device 120 may be implemented by any type of device that is capable of communicating with DSM device 110 and/or computing device 140 over network 130. In example network arrangement 100, server device 120 is configured with scan server 122 and Active Directory server 124, described in further detail below. Server device 120 may be configured with other mechanisms, processes and functionality, depending upon a particular implementation. In embodiments, scan server 122 and Active Directory server 124 are implemented as resident processes on Server device 120. In other embodiments, one or more of scan server 122 and Active Directory server 124 are made available to server device 120 on removable media or may be implemented at a remote location with respect to server device 120. Also, scan server 122 and Active Directory server 124 may be implemented as plug-ins, or in hardware, software, or any combination of hardware or software, depending upon a particular implementation.

Computing devices 140 and 150 may be implemented by any type of computing device that is capable of communicating with DSM device 110 and/or server device 120 over network 130. In example network arrangement 100, computing device 140 is configured with a control point service 142. Also in example network arrangement 100, computing device 150 is configured with an image transmission service 152 that may act as a remote image source that communicates with remote image receiver service 115 on DSM device 110, and is described in further detail below. In an embodiment, computing device 150 is capable of producing images. In this embodiment, computing device 150 may be a camera, a scanner, a copier, or any other device that produces image data. Computing devices 140 and 150 may be configured with other mechanisms, processes and functionalities, depending upon a particular implementation.

DSM Communications

DSM device 110 is considered to be a DSM-type device because DSM device 110, via DSM support service 111, communicates with control point service 142 using a distributed scan device protocol and with scan server 122 using a distributed scan processing protocol. In an embodiment, DSM support service 111 communicates with Active Directory server 124 via Lightweight Directory Access Protocol (LDAP).

Control point service 142 allows administrators to define PSPs and associate defined PSPs with one or more users or user groups. Control point service 142 causes information for the PSPs to be made accessible to Active Directory server 124. For example, control point service 142 stores PSP information at memory for server device 120 that is accessible by Active Directory server 124. In an embodiment, control point service 142 communicates with Active Directory server 124 via LDAP.

Web Services

The World Wide Web Consortium (W3C), which is an international consortium that develops standards for the World Wide Web, defines a "Web service" as a software system that is designed to support interoperable machine-to-machine interaction over a network. This definition encompasses many different systems, but in common usage, the term refers to those services that use Simple Object Access Protocol (SOAP)-formatted Extensible Markup Language (XML) envelopes and that have interfaces described using Web Services Description Language (WSDL). Web services allow devices and applications to communicate with each other over one or more networks without the intervention of any human being, while using the same suite of protocols (e.g., Hypertext Transfer Protocol (HTTP)) that a human being would use to communicate with such devices and applications over the one or more networks.

SOAP is an XML-based, extensible message envelope format, with bindings to underlying protocols (e.g., HTTP and Simple Mail Transfer Protocol (SMTP)). Using XML, SOAP defines how messages should be formatted, so that those messages are formatted in such a way that the recipients of those messages (devices and applications) can understand the messages.

WSDL is an XML format that allows Web service interfaces to be described along with the details of those interfaces' bindings to specific protocols. WSDL is typically used to generate server and client code, and for configuration.

Thus, common core protocols of Web services are SOAP, and WSDL, as well as WS-Discovery, WS-MetadataExchange, WS-Transfer, WS-Eventing, and WS-Addressing. WS-Addressing defines two constructs, message addressing properties and endpoint references. The constructs normalize the information typically provided by transport protocols and messaging systems in a way that is independent of any particular transport or messaging system. (Web Services Addressing 1.0-Core, W3C Recommendation 9 May 2006 found at "TR/ws-addr-core/" on the server "www.w3.org", published by the W3C, the contents of which are incorporated herein by reference.) A Web service endpoint is a (referenceable) entity, processor, or resource to which Web service messages can be addressed. (Id.) Endpoint references convey the information needed to address a Web service endpoint. (Id.)

Authentication and Configuration Identifiers

In an embodiment, a user may cause the DSM system represented in example network arrangement 100 to process image data that is available on a remote image source, such as image transmission service 152 of computing device 150. Many professionals utilize image data in the course of employment, and remote access to a DSM system allows users that are at remote locations relative to physical components of the DSM system to cause the DSM system to process image data. For example, a user desires the DSM system of network arrangement 100 to process image data that is stored at computing device 150. In an embodiment where computing device 150 has camera functionality, the image data may be captured by the user with the camera functionality of computing device 150.

As previously indicated, a DSM system processes image data according to PSP that is selected by a user. According to an embodiment, a remote image source is configured with a configuration identifier that is mapped to both particular user information and PSP in a particular DSM system. The remote image source sends the configuration identifier to the DSM system with the image data that is to be processed by the DSM system. The DSM system processes the received image data according to the PSP associated with the configuration identifier. A remote image source may send a particular configuration identifier to the DSM system with image data for multiple images.

Figure 2:
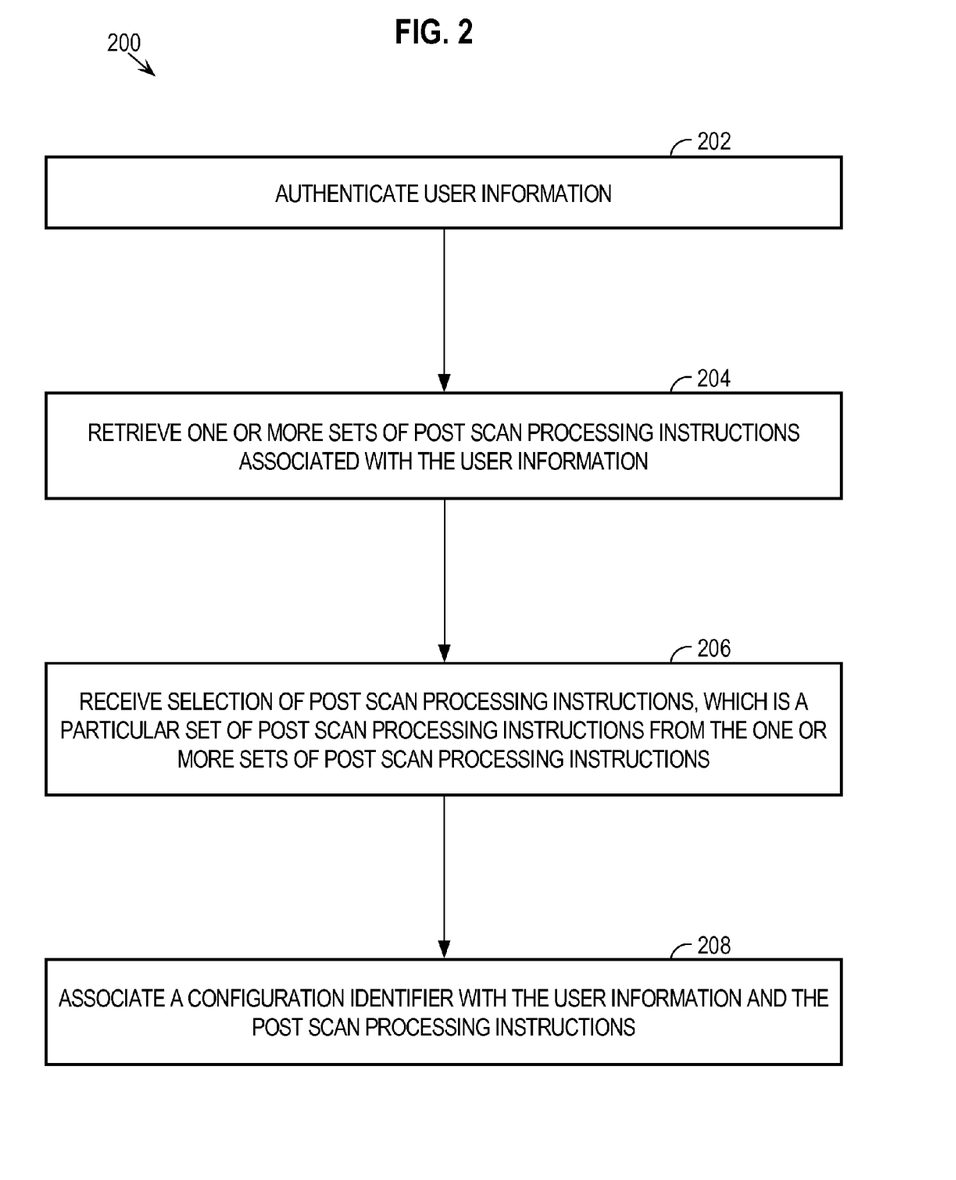
FIG. 2 illustrates a flowchart for initializing a configuration identifier for a remote image source.

FIG. 2 illustrates a flowchart 200 for initializing a configuration identifier for a remote image source. Ordering of the steps of flowcharts herein are exemplary, and do not necessarily limit embodiments of the invention to such ordering. At step 202, user information is authenticated. For example, a user inputs user information to DSM device 110 via graphical user interface 116. DSM support service 111 authenticates the user information with Active Directory server 124. If Active Directory server 124 does not authenticate the user information, then Active Directory server 124 returns an error to DSM support service 111.

At step 204, one or more sets of post scan processing instructions associated with the user information are retrieved. For example, Active Directory server 124 returns a list of PSPs associated with the authenticated user information to DSM support service 111. DSM support service 111 displays the list of PSPs at graphical user interface 116.

At step 206, selection of post scan processing instructions, which is a particular set of post scan processing instructions from the one or more sets of post scan processing instructions, is received. For example, DSM support service 111 receives selection of a particular PSP of the displayed list of PSPs via graphical user interface 116. The selected PSP may be configured for processing image data that is received from a remote image source.

At step 208, a configuration identifier is associated with the user information and the post scan processing instructions. For example, configuration service 114 creates a configuration identifier and associates the configuration identifier with the authenticated user information and the PSP that was selected at step 206. A mapping between (a) the configuration identifier and (b) the authenticated user information and selected PSP is stored at DSM device 110. A configuration identifier may be a sequence of alphanumeric characters that uniquely identifies the selected user information/PSP pair among other user information/PSP pairs stored at DSM device 110.

In one embodiment, configuration service 114 causes the configuration identifier created at step 208 to be displayed at graphical user interface 116. The user may input the displayed configuration identifier into image transmission service 152, as described in further detail below.

According to another embodiment, a user may be provided with a configuration identifier that is already mapped, at DSM device 110, to the user's information and a particular PSP. For example, an administrator of the system may create a configuration identifier, associate the configuration identifier with the user's information and a PSP that is appropriate for remote image acquisition. A user may input the configuration identifier into image transmission service 152, as described in further detail below.

In yet another embodiment, an administrator user configures a particular PSP for processing image data received from a remote image source and associates the PSP with a default user account at Active Directory server 124. A default user account is a user account with authentication information that is known to configuration service 114. The administrator user maps a PSP identifier to the PSP at DSM device 110. A user may input the PSP identifier into image transmission service 152, as described in further detail below. A PSP identifier may be a sequence of alphanumeric characters that uniquely identifies the PSP associated with the default user account. Image transmission service 152 may send a particular PSP identifier to the DSM system with image data for multiple images.

Configuration of a Remote Image Source

As previously indicated, a user may input configuration information (e.g., a configuration identifier, a PSP identifier, etc.) into a remote image source, such as image transmission service 152 of computing device 150. In one embodiment, image transmission service 152 provides a graphical user interface through which a user inputs configuration information to the service. In another embodiment, a user communicates the configuration information to image transmission service 152 via email, text message, using voice recognition, or in any other manner.

Acquisition from Remote Image Source

Figure 3:
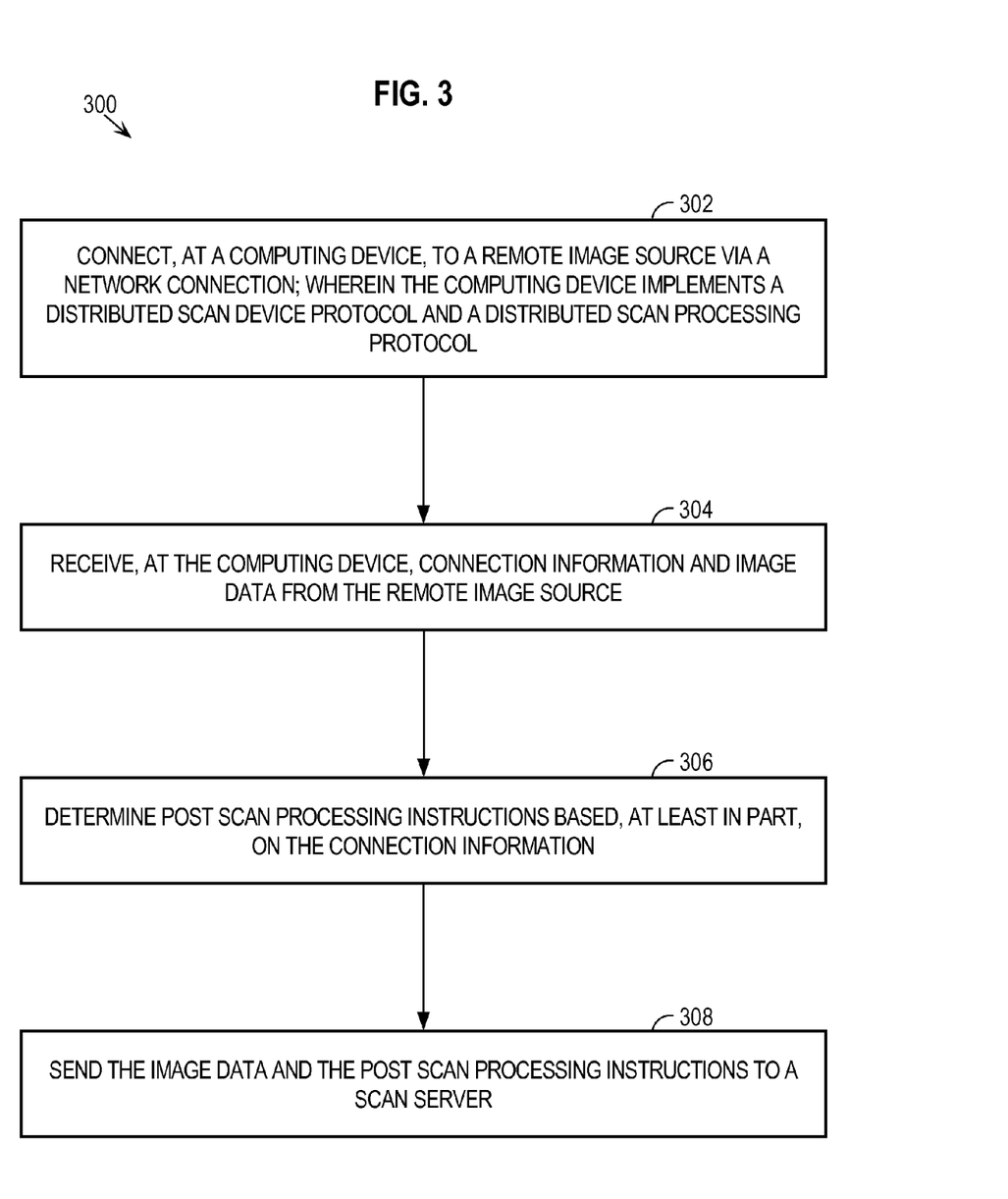
FIG. 3 illustrates a flowchart for a DSM system acquiring image data from a remote image source.

FIG. 3 illustrates a flowchart 300 for a DSM system acquiring image data from a remote image source. At step 302, a computing device is connected to a remote image source via a network connection, wherein the computing device implements a distributed scan device protocol and a distributed scan processing protocol. For example, remote image receiver service 115 at DSM device 110 and image transmission service 152 at computing device 150 connect using Web services (such as WS-Discovery, WS-Transfer, and WS-MetadataExchange) via network 130. As previously indicated, DSM device 110 communicates with control point service 142 using a distributed scan device protocol and with scan server 122 using a distributed scan processing protocol.

In one embodiment, image transmission service 152 is configured with information needed to connect to remote image receiver service 115 at DSM device 110 via Web services. For example, a user may input, to image transmission service 152, information that identifies remote image receiver service 115 for WS-Discovery, including a service type and a unique identifier for the DSM system represented in network arrangement 100. A unique identifier for the DSM system represented in network arrangement 100 uniquely identifies the DSM system among all other DSM systems accessible via network 130. As another example, computing device 150 is configured with information identifying remote image receiver service 115 for WS-Discovery in storage accessible to image transmission service 152, e.g., in a database.

For example, to connect to remote image receiver service 115, image transmission service 152 sends a multicast Probe message over network 130. The multicast Probe message indicates that image transmission service 152 seeks target services of a certain type, i.e., a remote image receiver service at a particular DSM system. For example, the multicast Probe message includes the service type indicator "RemoteImageReceiver". Image transmission service 152 also includes, in the Probe message, a unique identifier of the particular DSM system with which image transmission service 152 seeks to connect, i.e., the DSM system of network arrangement 100. The Probe message may also include information about other aspects of the service sought by image transmission service 152.

Remote image receiver service 115, available on DSM device 110, is accessible over network 130 and receives the multicast Probe message from image transmission service 152. Remote image receiver service 115 determines that remote image receiver service 115 is a service of type "RemoteImageReceiver", that remote image receiver service 115 is associated with the particular DSM system indicated by the DSM system identifier, and that remote image receiver service 115 complies with all other aspects of the requested service, as indicated by the Probe message.

In response to this determination, remote image receiver service 115 sends a unicast Probe Match message to image transmission service 152 to indicate that DSM device 110 includes a service of the requested type, i.e., remote image receiver service 115. Such a Probe Match message includes an endpoint reference for remote image receiver service 115. The endpoint reference may include a source IP address for remote image receiver service 115, including a port number at which remote image receiver service 115 may be accessed. For example, the Probe Match message sent by remote image receiver service 115 may indicate to image transmission service 152 that remote image receiver service 115 is at IP address "172.30.4.223", and is accessible at port "1600". Image transmission service 152 uses this endpoint reference to communicate image data and configuration information to remote image receiver service 115.

In another embodiment, image transmission service 152 accepts configuration information and/or endpoint reference information for remote image receiver service 115, e.g., via a graphical user interface at computing device 150. Image transmission service 152 uses the received information to communicate with remote image receiver service 115 via Web services. In yet another embodiment, computing device 150 includes one or more of configuration information and an endpoint reference for remote image receiver service 115 in storage accessible by image transmission service 152. In yet another embodiment, DSM device 110 includes endpoint reference information for image transmission service 152 in storage accessible by remote image receiver service 115.

At step 304, connection information and image data are received at the computing device from the remote image source. For example, image transmission service 152 is configured with a configuration identifier. Image transmission service 152 sends the configuration identifier and image data to remote image receiver service 115 using Web services. In an embodiment, image transmission service 152 uses the SOAP Message Transmission Optimization Mechanism (MTOM) protocol to send the image data to remote image receiver service 115.

Remote image receiver service 115 listens for such communications from image transmission service 152, and receives the configuration identifier and image data from image transmission service 152 when the information is sent. Depending upon a particular implementation, remote image receiver service 115 may receive further information from image transmission service 152, including one or more of image format information, image size information, etc.

In an embodiment, remote image receiver service 115 receives a PSP identifier and image data from image transmission service 152.

At step 306, post scan processing instructions are determined based, at least in part, on the connection information. For example, remote image receiver service 115 causes configuration service 114 to retrieve the user information and PSP information mapped to the received configuration identifier. In one embodiment, configuration service 114 authenticates the user information and verifies that the PSP information is valid. PSP information is valid if the user information is still associated with the identified PSP. If the user information does not authenticate or the PSP information is not valid, then the services of DSM device 110 do not continue with the steps of flowchart 300. If the user information authenticates and the PSP information is valid, then configuration service 114 communicates the identified PSP to remote image receiver service 115. The identified PSP will be used to process the received image data.

In an embodiment where the configuration information sent from image transmission service 152 comprises a PSP identifier, configuration service 114 retrieves the applicable PSP based on the PSP identifier. For example, configuration service 114 recognizes that the PSP identifier identifies a PSP associated with a default user account (for which authentication information is known by configuration service 114) and searches for a mapping between the PSP identifier and a PSP associated with the default user account. For example, configuration service 114 may authenticate the known default user information with Active Directory server 124 in order to obtain the PSPs associated with the default user account. If the PSP identifier is mapped to a PSP associated with the default user account, then the identified PSP is used to process the received image data. If the PSP identifier is not mapped to a PSP associated with the default user account, then the services of DSM device 110 do not continue with the steps of flowchart 300.

In an embodiment where the identified PSP includes data acquisition settings that are applicable to the manner of data acquisition used to acquire the image data, such settings are applied to received image data.

At step 308, the image data and the post scan processing instructions are sent to a scan server. Within embodiments of the invention, any service running on DSM device 110 may send information for the image data and identified PSP to scan server 122 for processing, including DSM support service 111, configuration service 114, remote image receiver service 115, etc. To illustrate one embodiment, remote image receiver service 115 calls an API function for DSM support service 111 and passes to DSM support service 111 the identified PSP and information for the received image data (i.e., a reference to the received image data stored at DSM device 110, the received image data itself, etc.). DSM support service 111 transmits the PSP and information for the received image data to scan server 122 using a distributed scan processing protocol. Scan server 122 processes the image data according to the accompanying PSP, including dispatching at least a portion of the image data to the destinations defined in the accompanying PSP.

In one embodiment, image transmission service 152 sends configuration information to remote image receiver service 115 separately with image data corresponding to each image file. In another embodiment, image transmission service 152 sends configuration information to remote image receiver service 115 with information for image data corresponding to multiple image files.

Status Update

Image transmission service 152 may request, from remote image receiver service 115, information on the status of processing image data that image transmission service 152 has sent to remote image receiver service 115. To illustrate, image transmission service 152 sends a request to remote image receiver service 115, via Web services, requesting the status of processing particular image data. Image transmission service 152 may identify particular image data in the request using an image data identifier that uniquely identifies image data that has been sent to remote image receiver service 115. In response to receiving the request, remote image receiver service 115 retrieves information on the status of processing the particular image data, e.g., from DSM support service 111. An example of information on the status of processing particular image data is "Complete", "Pending", "Cancelled", etc.

Acquisition from Selected Input Source

In an embodiment, the DSM system represented in network arrangement 100 processes image data that is acquired from an input source that is selected by a user at DSM device 110. For example, a user may request that the DSM system represented in network arrangement 100 process image data stored on an additional input source to the DSM system, such as a thumb drive, external hard drive, SD card, or any other device that may supply image data to DSM device 110. The user identifies an input source available at DSM device 110, and, if applicable, may select image data that is stored at the input source, which causes DSM device 110 to acquire the image data from the input source and initiate processing the image data according to a selected PSP.

Figure 4:
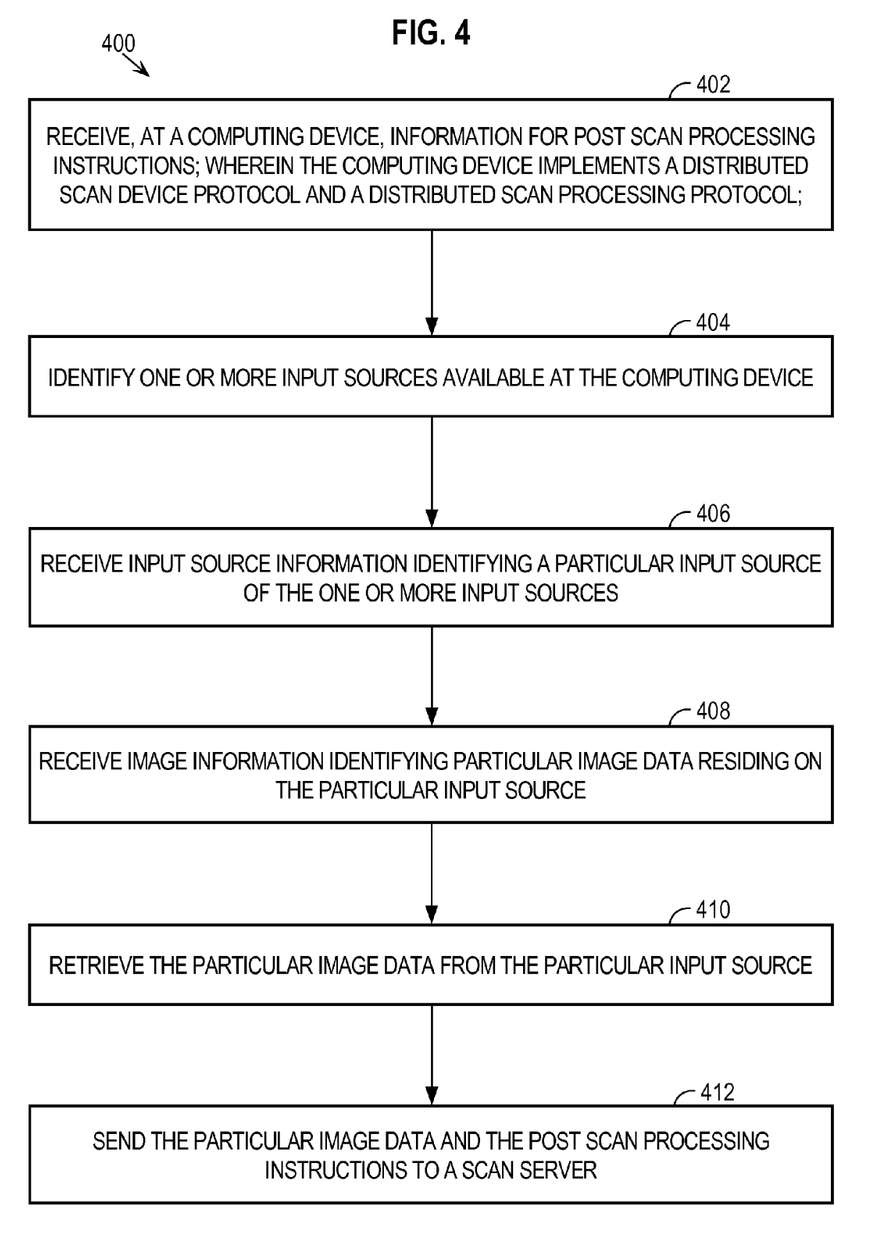
FIG. 4 illustrates a flowchart for processing image data from a selected input source.

FIG. 4 illustrates a flowchart 400 for processing image data from a selected input source. At step 402, information for post scan processing instructions is received at a computing device, wherein the computing device implements a distributed scan device protocol and a distributed scan processing protocol. For example, a particular user inputs user authentication information to DSM device 110 via graphical user interface 116. DSM support service 111 authenticates the user information with Active Directory server 124. Active Directory server 124 returns, to DSM support service 111, a list of PSPs that are associated with the authenticated user. DSM support service 111 causes the list of PSPs to be displayed at graphical user interface 116. When the user selects a particular PSP from the list of PSPs, e.g., via graphical user interface 116, DSM support service 111 receives information for the selected PSP. As previously indicated, DSM device 110 communicates with control point service 142 using a distributed scan device protocol and with scan server 122 using a distributed scan processing protocol.

At step 404, one or more input sources available at the computing device are identified. For example, input selection service 113 of DSM device 110 identifies one or more input sources available at DSM device 110. An input source that is available at DSM device 110 is a source that may supply DSM device with image data. The one or more input sources may include scan service 112, an SD card, a thumb drive connected to DSM device 110, an external hard drive connected to DSM device 110, or any other device communicatively coupled to DSM device 110 that provides services of DSM device 110 with image data. For example, a thumb drive (or other storage device) that is connected to a USB port (or any other kind of port) of DSM device 110 is an input source available at DSM device 110. As another example, a service running on DSM device 110 (such as scan service 112) that may supply DSM device with image data is an input source available at DSM device 110.

At step 406, input source information identifying a particular input source of the one or more input sources is received. For example, input selection service 113 causes information for the one or more identified input sources that are available at DSM device 110 to be displayed at graphical user interface 116 for user selection. When the user selects an input source of the one or more displayed input sources, input selection service 113 receives information identifying the selected input source. In one embodiment, input selection service 113 receives information identifying an input source other than scan service 112.

At step 408, image information identifying particular image data residing on the particular input source is received. For example, input selection service 113 displays, at graphical user interface 116, a directory listing reflecting information stored at the selected input source. The user may browse through the directory listing and select an image file, corresponding to particular image data, stored at the input source. Input selection service 113 receives information identifying the selected image file. In an embodiment, the user may select, for processing, multiple image files stored at the input source.

In an embodiment where the input source is not a storage device, input selection service 113 receives information identifying particular image data from the input source. In an example where the selected input source is scan service 112, input selection service 113 receives scanned document data, which identifies the scanned document data as the particular image data.

At step 410, the particular image data is retrieved from the particular input source. For example, input selection service 113 retrieves the particular image data corresponding to the selected image file from the selected input source based on the information identifying the selected input source and the information identifying the selected image file.

At step 412, the particular image data and the post scan processing instructions are sent to a scan server. Within embodiments of the invention, any service running on DSM device 110 may send information for the selected image data and PSP to a scan server for processing, including DSM support service 111, input selection service 113, etc. To illustrate one embodiment, input selection service 113 calls an API function for DSM support service 111 and passes to DSM support service 111 the PSP and information for the particular image data (e.g., a reference to the particular image data stored at DSM device 110, the particular image data itself, etc.). DSM support service 111 transmits the PSP and information for the particular image data to scan server 122 using a distributed scan processing protocol. Scan server 122 processes the received image data according to the accompanying PSP, including dispatching at least a portion of the received image data to the destinations defined in the accompanying PSP.

In an embodiment, if the user selects multiple image files from the selected input source, input selection service 113 sends information for image data corresponding to each of the multiple image files to scan server 122 separately, each with the selected PSP.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
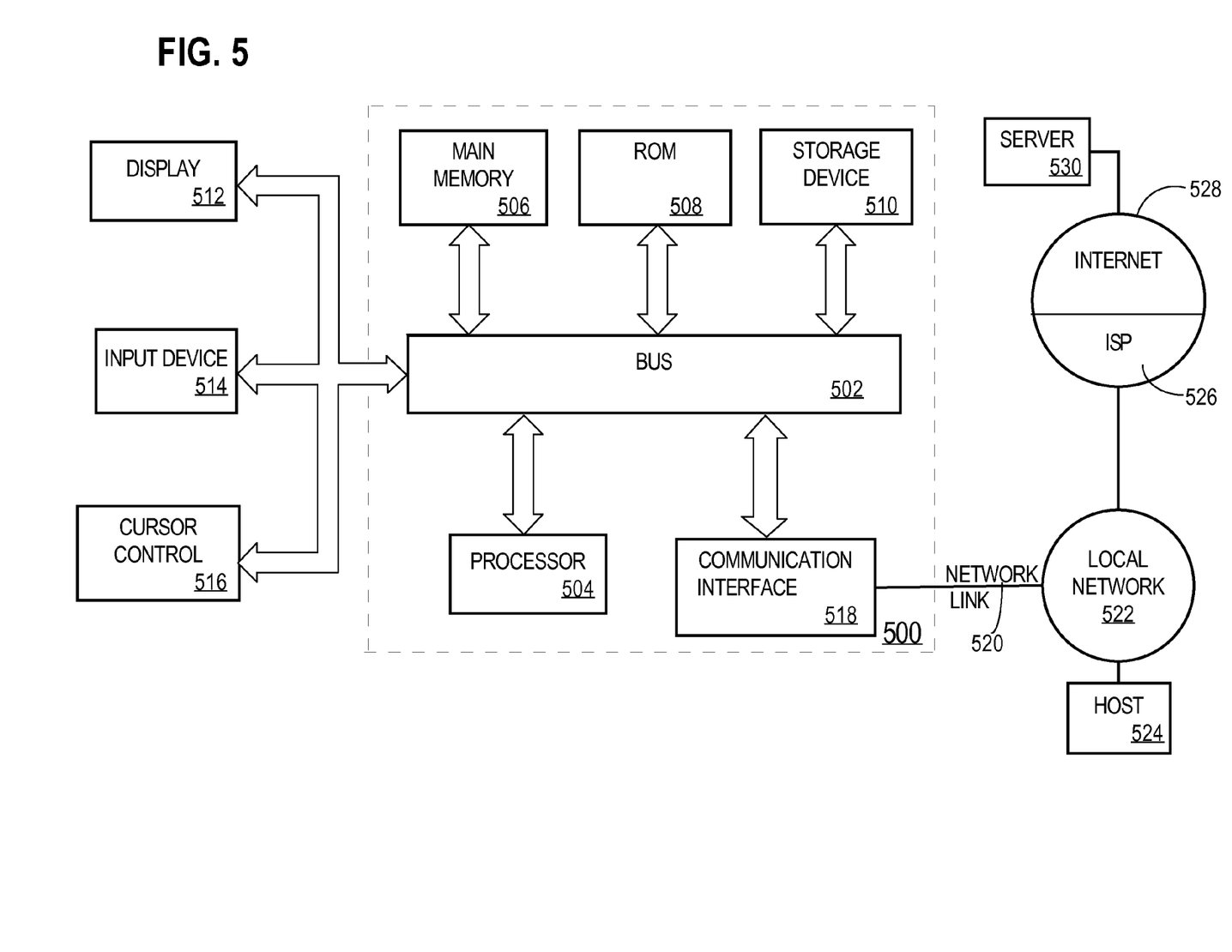
FIG. 5 is a block diagram of a computer system on which embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510.

Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computing device comprising:
   one or more processors;
   one or more memories;
   a scan service, implemented by the one or more processors, and being configured to scan a document;
   a configuration service, implemented by the one or more processors, and being configured to:
      prior to a remote image receiver service receiving a particular configuration identifier and image data from a remote image source:
      authenticate user information;
      retrieve one or more sets of post scan processing instructions associated with the user information;
      receive selection of a particular set of post scan processing instructions from the one or more sets of post scan processing instructions associated with the user information; and
      in response to receiving selection of the particular set of post scan processing instructions, store mapping data that maps the particular configuration identifier with the user information and the particular set of post scan processing instructions;
   the remote image receiver service, implemented by the one or more processors, and being configured to:
      connect the computing device to the remote image source via a network connection, wherein the remote image source is distinct from the computing device,
      receive the particular configuration identifier and the image data from the remote image source, and
      identify the particular set of post scan processing instructions, from among a plurality of sets of post scan processing instructions, based, at least in part, on the mapping data that maps the particular set of post scan processing instructions to the particular configuration identifier;
   a distributed scan management support service that implements a distributed scan device protocol and a distributed scan processing protocol;
   wherein the distributed scan management support service is implemented by the one or more processors, and is configured to: send the image data and the particular set of post scan processing instructions to a scan server.

2. The computing device of claim 1, wherein:
   the configuration service is further configured to:
      retrieve, based at least in part on the mapping data, user information that is mapped to the particular configuration identifier;
      determine whether the user information authenticates;
      determine whether the particular set of post scan processing instructions is currently associated with the user information; and the remote image receiver service identifying the particular set of post scan processing instructions is performed in response to determining that (a) the user information authenticates, and (b) the particular set of post scan processing instructions is currently associated with the user information.

3. The computing device of claim 1, wherein the particular configuration identifier comprises an identifier of the particular set of post scan processing instructions.

4. The computing device of claim 3, wherein the configuration service is further configured to:
  authenticate default user information; and
  wherein the plurality of sets of post scan processing instructions are associated with the default user information; and
  wherein identifying the particular set of post scan processing instructions, from among the plurality of sets of post scan processing instructions, comprises identifying the particular set of post scan processing instructions, based on the identifier of the particular set of post scan processing instructions, from among the plurality of sets of post scan processing instructions associated with the default user information.

5. The computing device of claim 1, wherein the remote image receiver service is further configured to:
  connect the computing device to the remote image source via the network connection using Web services; and
  receive the particular configuration identifier and the image data from the remote image source using Web services.

6. One or more non-transitory computer-readable media storing instructions which, when processed by one or more processors, cause:
  a scan service executing on a computing device and configured to scan a document;
  a configuration service executing on the computing device and:
    prior to a remote image receiver service receiving a particular configuration identifier and image data from a remote image source:
      authenticating user information,
      retrieving one or more sets of post scan processing instructions associated with the user information,
      receiving selection of a particular set of post scan processing instructions from the one or more sets of post scan processing instructions associated with the user information, and
      in response to receiving selection of the particular set of post scan processing instructions, storing mapping data that maps the particular configuration identifier with the user information and the particular set of post scan processing instructions;
  the remote image receiver service executing on the computing device and:
    connecting the computing device to the remote image source via a network connection, wherein the remote image source is distinct from the computing device,
    receiving the particular configuration identifier and the image data from the remote image source, and
    identifying the particular set of post scan processing instructions, from among a plurality of sets of post scan processing instructions, based, at least in part, on the mapping data that maps the particular set of post scan processing instructions to the particular configuration identifier; and
  a distributed scan management support service executing on the computing device and:
    implementing a distributed scan device protocol and a distributed scan processing protocol, and
    sending the image data and the particular set of post scan processing instructions to a scan server.

7. The one or more non-transitory computer-readable media of claim 6, wherein the instructions further comprise instructions which, when executed by one or more processors, cause:
  retrieving, based at least in part on the mapping data, user information that is mapped to the particular configuration identifier;
  determining whether the user information authenticates;
  determining whether the particular set of post scan processing instructions is currently associated with the user information; and
  wherein identifying the particular set of post scan processing instructions is performed in response to determining that (a) the user information authenticates, and (b) the particular set of post scan processing instructions is currently associated with the user information.

8. The one or more non-transitory computer-readable media of claim 6, wherein the particular configuration identifier comprises an identifier of the particular set of post scan processing instructions.

9. The one or more non-transitory computer-readable media of claim 8, further comprising instructions which, when processed by the one or more processors, cause the configuration service:
  authenticating default user information;
  wherein the plurality of sets of post scan processing instructions are associated with the default user information; and
  wherein identifying the particular set of post scan processing instructions, from among the plurality of sets of post scan processing instructions, comprises identifying the particular set of post scan processing instructions, based on the identifier of the particular set of post scan processing instructions, from among the plurality of sets of post scan processing instructions associated with the default user information.

10. The one or more non-transitory computer-readable media of claim 6, further comprising instructions which, when processed by the one or more processors, cause the remote image receiver service:
  connecting the computing device to the remote image source via the network connection using Web services; and
  receiving the particular configuration identifier and the image data from the remote image source using Web services.

11. A computer-executed method comprising:
  a computing device executing a scan service configured to scan a document;
  prior to receiving a particular configuration identifier and image data from a remote image source:
    the computing device authenticating user information,
    the computing device retrieving one or more sets of post scan processing instructions associated with the user information,
    the computing device receiving selection of a particular set of post scan processing instructions from the one or more sets of post scan processing instructions associated with the user information, and
    in response to receiving selection of the particular set of post scan processing instructions, the computing device storing mapping data that maps the particular configuration identifier with the user information and the particular set of post scan processing instructions;

the computing device connecting to the remote image source via a network connection, wherein the remote image source is distinct from the computing device;

the computing device receiving the particular configuration identifier and the image data from the remote image source via the network connection;

the computing device identifying the particular set of post scan processing instructions, from among a plurality of sets of post scan processing instructions, based, at least in part, on the mapping data that maps the particular set of post scan processing instructions to the particular configuration identifier; and sending the image data and the the particular set of post scan processing instructions to a scan server;

wherein the computing device implements a distributed scan device protocol and a distributed scan processing protocol.

12. The computer-executed method of claim 11, further comprising:

retrieving, based at least in part on the mapping data, user information that is mapped to the particular configuration identifier;

determining whether the user information authenticates;

determining whether the particular set of post scan processing instructions is currently associated with the user information; and wherein identifying the particular set of post scan processing instructions is performed in response to determining that (a) the user information authenticates, and (b) the particular set of post scan processing instructions is currently associated with the user information.

13. The computer-executed method of claim 11, wherein the particular configuration identifier comprises an identifier of the particular set of post scan processing instructions.

14. The computer-executed method of claim 13, further comprising:

authenticating default user information;

wherein the plurality of sets of post scan processing instructions are associated with the default user information; and wherein identifying the particular set of post scan processing instructions, from among the plurality of sets of post scan processing instructions, comprises identifying the particular set of post scan processing instructions, based on the identifier of the particular set of post scan processing instructions, from among the plurality of sets of post scan processing instructions associated with the default user information.

15. The computer-executed method of claim 11, further comprising:

connecting the computing device to the remote image source via the network connection using Web services; and receiving the particular configuration identifier and the image data from the remote image source using Web services.

\* \* \* \* \*